United States Patent
Raisch et al.

(10) Patent No.: US 11,115,340 B2
(45) Date of Patent: Sep. 7, 2021

(54) GUARANTEED DELIVERY IN RECEIVER SIDE OVERCOMMITTED COMMUNICATION ADAPTERS

(71) Applicant: International Business Machines Corporation, Armonk, NY (US)

(72) Inventors: Christoph Raisch, Gerlingen (DE); Kishorekumar G. Pillai, Bangalore (IN); Alol Antony Crasta, Bangalore (IN); Raghavan Devanathan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 45 days.

(21) Appl. No.: 16/018,205

(22) Filed: Jun. 26, 2018

(65) Prior Publication Data
US 2019/0394138 A1    Dec. 26, 2019

(51) Int. Cl.
| | |
|---|---|
| *H04L 12/835* | (2013.01) |
| *H04L 12/861* | (2013.01) |
| *H04L 12/883* | (2013.01) |
| *H04L 29/08* | (2006.01) |
| *G06F 3/06* | (2006.01) |

(52) U.S. Cl.
CPC .......... *H04L 47/30* (2013.01); *H04L 49/9005* (2013.01); *H04L 49/9021* (2013.01); *H04L 67/1097* (2013.01); *G06F 3/067* (2013.01)

(58) Field of Classification Search
CPC . H04L 47/30; H04L 49/9005; H04L 49/9021; H04L 67/1097; G06F 3/067
See application file for complete search history.

(56) References Cited

U.S. PATENT DOCUMENTS

| 8,762,681 | B2 | 6/2014 | Banzhaf et al. |
| 8,918,542 | B2 | 12/2014 | Carlson et al. |
| 9,021,155 | B2 | 4/2015 | Bender et al. |
| 9,298,633 | B1* | 3/2016 | Zhao ................... G06F 12/0862 |
| 2003/0208564 | A1* | 11/2003 | Miyake ................... G06F 16/10 |
| | | | 709/219 |
| 2004/0202073 | A1* | 10/2004 | Lai ......................... G06F 3/0625 |
| | | | 369/47.33 |

(Continued)

*Primary Examiner* — Michael Thier
*Assistant Examiner* — Nevena Zecevic Sandhu
(74) *Attorney, Agent, or Firm* — Cantor Colburn LLP; Steven Chiu

(57) ABSTRACT

Aspects of the invention include receiving an input/output (I/O) request that includes a data stream from a host processor. The receiving is at a network adapter of a storage controller that manages storage for the host processor. The storage controller includes a storage buffer to store data received from the host processor before migrating it to the storage. The storage controller also includes a data cache. It is determined whether the storage buffer has enough free space to store the received data stream. Based at least in part on determining that the storage buffer has enough free space to store the received data stream, the received data stream is stored by the network adapter in the storage. Based at least in part on determining that the storage buffer does not have enough free space to store the received data stream, the received data stream is stored in the data cache.

19 Claims, 4 Drawing Sheets

(56) References Cited

U.S. PATENT DOCUMENTS

| | | | |
|---|---|---|---|
| 2004/0223505 A1* | 11/2004 | Kim | H04L 47/14 370/412 |
| 2012/0110377 A1* | 5/2012 | Sundrani | G06F 3/061 714/6.22 |
| 2012/0159003 A1 | 6/2012 | Craig et al. | |
| 2012/0317360 A1* | 12/2012 | Zettler | G06F 12/0888 711/122 |
| 2013/0242909 A1* | 9/2013 | Kim | H04W 72/08 370/329 |
| 2013/0343390 A1* | 12/2013 | Moriarty | H04L 43/0852 370/392 |
| 2016/0342549 A1 | 11/2016 | Hathorn et al. | |
| 2017/0097976 A1 | 4/2017 | Craddock et al. | |
| 2020/0267787 A1* | 8/2020 | Teyeb | H04W 76/27 |

* cited by examiner

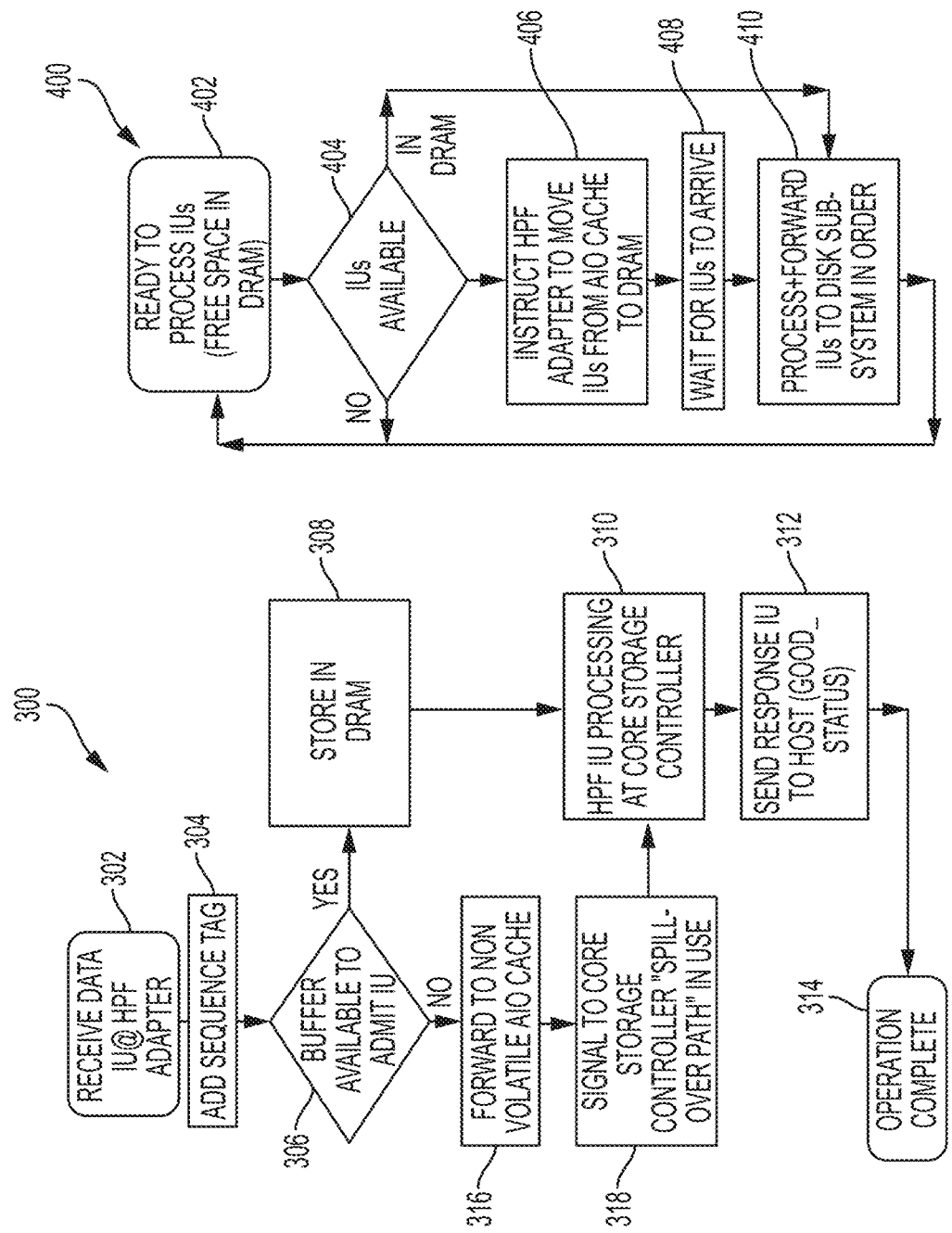

GUARANTEED DELIVERY IN RECEIVER SIDE OVERCOMMITTED COMMUNICATION ADAPTERS

BACKGROUND

Embodiments of the present invention related in general to transferring data across channels, and more specifically to using secondary memory to guarantee delivery in receiver side overcommitted communication adapters.

Input/output (I/O) operations may be used to transfer data between memory and I/O devices of an I/O processing system. For example, data may be written from memory to one or more I/O devices, and data may be read from one or more I/O devices to memory by executing I/O operations. To facilitate processing of I/O operations, an I/O subsystem of the I/O processing system may be employed. The I/O subsystem is coupled to main memory and the I/O devices of the I/O processing system and directs the flow of information between memory and the I/O devices. One example of an I/O subsystem is a channel subsystem. The channel subsystem uses channel paths as communications media. Each channel path includes a channel coupled to a control unit, the control unit being further coupled to one or more I/O devices.

In certain mechanisms, the channel subsystem and I/O device may operate in a transport mode that supports the transfer of one or more command control blocks to transfer data between the I/O devices and memory. A transport control word (TCW) may specify one or more I/O commands to be executed. For commands initiating certain I/O operations, the TCW designates memory areas associated with the operation, the action to be taken whenever a transfer to or from the area is completed, and other options.

In certain situations, the control unit may be included in a storage device. In other situations, the control unit may be included in a storage controller in which a storage management application that executes in the storage controller may manage a plurality of storage devices, such as disk drives, tape drives, flash drives, etc., that are coupled to the storage controller. The channels to communicate with the control unit may be used by a plurality of hosts that may access data stored in the storage devices.

Fibre channel refers to an integrated set of architectural standards for data transfer developed by the American National Standards Institute. An implementation of fibre connection, IBM® FICON®, is a protocol of the fibre channel architecture. A channel is a direct or a switched point-to-point connection between communicating devices. In the fibre channel architecture, a FICON channel provides access to I/O devices by means of control units or emulated control units. FICON channels may rely on packet switching for transferring data between communicating devices.

In certain situations, data transfers sent to I/O devices may lead to data overflow at their respective control units, or communication adapters, if data is transferred at a rate that exceeds the ability of the control units to process the data.

Accordingly, while existing methods of transferring data across channels are suitable for their intended purposes, what is needed are data transfer methods having certain features of embodiments of the present invention.

SUMMARY

Embodiments of the present invention include methods, systems, and computer program products for using secondary memory to guarantee delivery in receiver side overcommitted communication adapters. A non-limiting example method includes receiving an input/output (I/O) request that includes a data stream from a host processor. The receiving is at a network adapter of a storage controller that manages storage for the host processor. The storage controller includes a storage buffer to store data received from the host processor before migrating it to the storage. The storage controller also includes a data cache. It is determined whether the storage buffer has enough free space to store the received data stream. Based at least in part on determining that the storage buffer has enough free space to store the received data stream, the received data stream is stored by the network adapter in the storage. Based at least in part on determining that the storage buffer does not have enough free space to store the received data stream, the received data stream is stored in the data cache. Based at least in part on storing the received data stream in the data cache: determining an amount of free space in the storage buffer; and moving the received data stream from the data cache to the storage buffer based on the amount of free space in the storage buffer being greater than an estimated amount of space required to store the received data stream.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 is a flow diagram of a process at a receiver side communication adapter in accordance with one or more embodiments of the present invention;

FIG. 4 is a flow diagram of a process at a core storage controller in accordance with one or more embodiments of the present invention.

Figure 1:
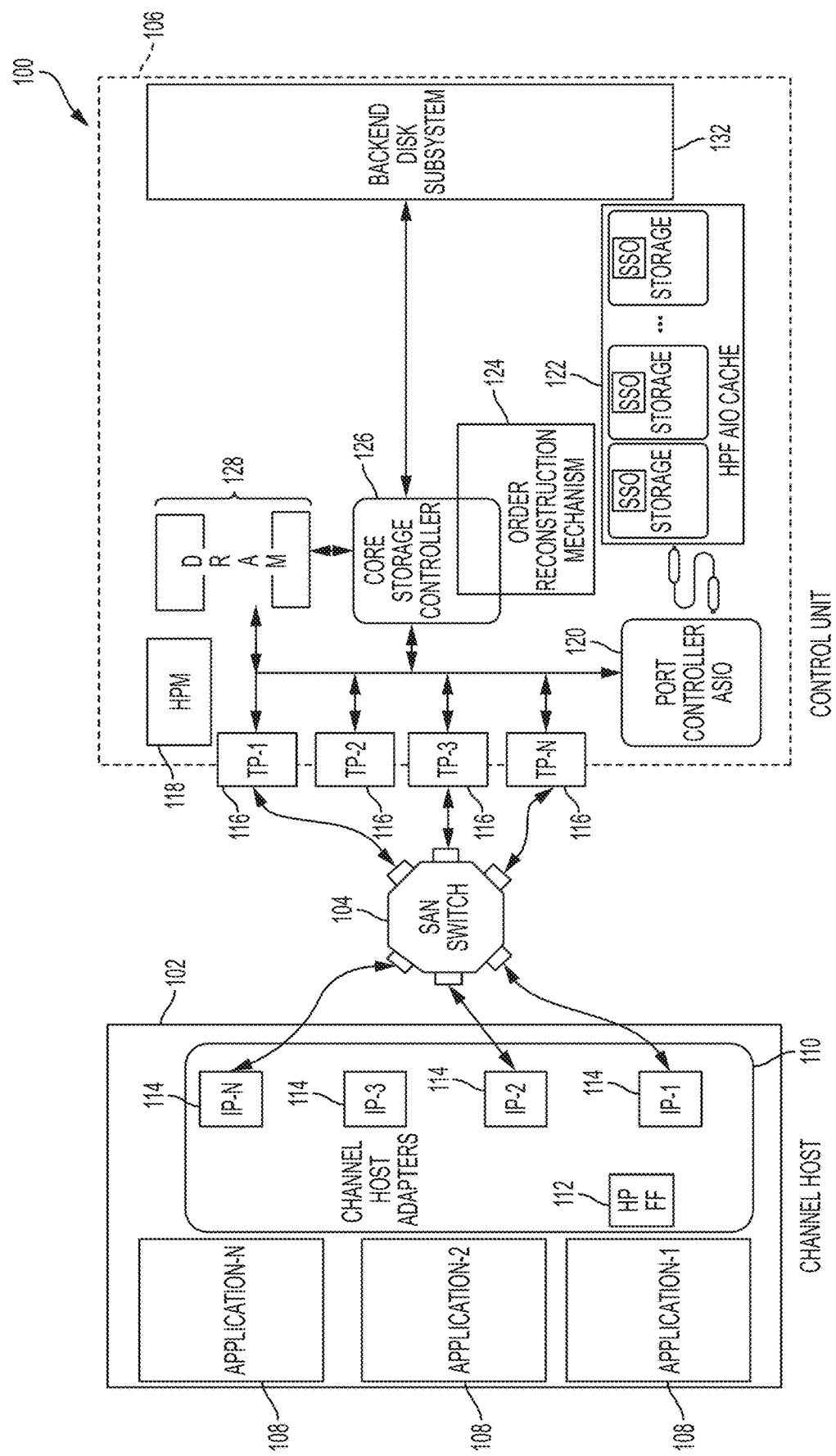
FIG. 1 depicts a system for guaranteed delivery in receiver side overcommitted communication adapters in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

One or more embodiments of the present invention use secondary memory to guarantee delivery in receiver side overcommitted communication adapters. In, for example, contemporary fibre connection (FICON) and FICON in high performance mode (HPF) networks the target side of a storage operation announces its internal buffering capacity to each individual initiator. As multiple initiators share the same target, the target typically announces more buffering capacity to individual initiators than is actually available and over-subscription may occur. This scheme works under the assumption that not all initiators will be active at the same time and use the target sides fully announced capacity. In contemporary systems, if more than the available buffer capacity is requested by initiators, transfer requests (e.g., write data to disk) from individual initiators are rejected, the target side announces a smaller amount of buffer capacity to the initiator, and the initiator retries the operation with a smaller amount of buffer capacity consumed. One or more embodiments of the present invention provide a device and/or method to handle the oversubscribed target internal buffers.

In other related contemporary technology, the initiator side requests a write to disk by a first request which is responded to by the target with buffer capacity in a second request, followed by sending the actual data from the initiator again in a third request staying within the reported buffer capacity. One or more embodiments of the present invention merge the first and third request to allow for uninterrupted operation. In one or more embodiments of the present invention, secondary line speed storage is used on the communication adapters to prevent the over-subscription from occurring.

One or more embodiments of the present invention utilize a high-speed persistent flash cache between a HPF target adapter and a dynamic random access memory (DRAM) to avoid large expensive DRAM capacity and to avoid overflow scenarios of data being sent to HPF target adapters fast than they can be processed. The persistent cache can be used to stream data that exceeds the HPF target adapter buffer size directly to the persistent flash. The high-speed persistent storage device cache is used as an extended buffer persistently storing the data for later processing by a control unit of a storage controller, thus allowing an inexpensive large extended buffer which can avoid having to use fallback solutions associated with exceeding buffer sizes.

One or more embodiments of the present invention provide the ability for a channel host in a HPF storage network environment to send nearly an unlimited number of information units (IUs) in-flight to a control unit of a storage controller and to process these IUs at wire speed. This eliminates the frequent unexpected retries of IUs often seen in contemporary systems as a result of inadequate buffer capacity when buffer commitments advertised to initiators cannot be met by target adapters.

As used herein, the term "information unit" or "IU" refers to a collection of data that is organized according to a particular structure depending on the function being performed or the data content. As used herein, the term "in-flight" refers to a stream of information units in transit from source to destination. As used herein, the term "process at wire speed" refers to any hardware device or function that tends to support the data transfer rate as per its specification without slowing it down.

Contemporary approaches to avoiding data overflow include mechanisms that provide a data transfer control feature that allows the control unit to specify a number and/or size of first-transfer buffers available to the channel. In certain situations, the data transfer control feature defines a first-transfer-buffer size (FTBS) value specified by the control unit, and a first-transfer-buffer credits (FTBC) value. FTBC may also be referred to as a buffer credit promised by control unit. The FTBS and FTBC are stored in the channel and used to limit the amount of data that can be transferred to the control unit in a first data transfer message.

Another contemporary mechanism to avoid data overflow is for the control unit to send a command retry message to the channel subsystem, the command retry message including a request that a message be resent to the control unit.

A further contemporary mechanism to avoid data overflow, used by HPF, is persistent IU pacing to allow FICON channels to have more IUs in-flight by retaining a pacing count that is used at the start of execution of a channel program. The IU pacing count is the maximum number of IUs a channel may send on a given outbound exchange before it receives a command-response IU.

Persistent IU pacing is a method used by HPF that allows FICON channels to have more IUs in-flight and retain a pacing count that may be used at the start of execution of a channel program. The channel retains the pacing count value, presented by the control unit in accordance with the standard, and uses that pacing count value as its new default pacing count for any new channel programs issued on the same logical path, which relieves the use of transfer ready for buffer availability announcement (i.e., the channel need not wait for a transfer ready IU from control unit which consists of data length that can be transferred). HPF therefore expands the limit from sixteen (16) IUs in-flight to two-hundred and fifty-five (255) IUs in-flight without waiting for an acknowledgement from the control unit, eliminating all control handshakes between the channel and the control unit. This can improve the performance of long I/O programs at higher link speeds and long distances by allowing the channel to send more IUs to the control unit, thereby eliminating the delay of waiting for the first command response.

However, while HPF can enhance the performance of FICON traffic going over a long distance, it can be compromised often and provides only near online I/O rates (e.g., a rate between high I/O rates and medium I/O rates). One reason is that the first time buffer credit (FTBC) announced by the control unit and negotiated by the channel is not always guaranteed as it is a point-in-time value calculated by the control unit based on the current resource availability. The FTBC can change if more resource requirements are anticipated at the control unit based, for example, on a new channel host connection to the control unit. Another reason that HPF only provides nearline I/O rates is that beyond a retry threshold, the retry mechanism that follows subsequently switches to a slow mode behavior, where the IU is retried in entirety over long-haul, one IU at a time. In addition, the protocol is not flexible to accommodate larger values of persistent IU pacing, as the HPF command (transport command) IU can ship only thirty (30) commands at one time. If there are more, a new transport data IU is dispensed to accommodate the remaining up to two-hundred and twenty five (255-30) commands. The control unit upon recognition of this case must wait for the new transport data IU to arrive at the controller end.

The persistent IU pacing provided by HPF allows more channel command words (CCWs) to be in-flight than traditional FICON, however it is not designed to provide the best utilization of a FICON link for all types of long haul communication. The HPF initiator allows only limited number of commands to be shipped (current protocol limit is twenty-two commands) in a command IU in HPF mode. For example, database replication or perfecting application needs more than this limit (e.g., a minimum of thirty-two commands) for long haul transactions. One or more embodiments described herein utilize a new IU type referred to herein as an all-in-one (AIO) IU to provide seamless in-flight transmission of CCWs from channel to controller with zero retries for HPF. An embodiment of the AIO IU can be used by an initiator to send nearly an unlimited number of commands to a target as part of a bulk data transfer.

Turning now to FIG. 1, a system 100 for guaranteed delivery in receiver side overcommitted communication adapters is generally shown in accordance with one or more embodiments of the present invention. The system 100 shown FIG. 1 includes a channel host 102, a storage area network (SAN) switch 104, and a control unit 106. Applications 108 execute in the channel host 102 (also referred to herein as the "host computer system" or "host processor") and the channel host 102 ships I/Os to and from the core storage controller 126 on the control unit 106 via channel host adapter firmware 110 and one or more SAN switches 104 capable of shipping HPF traffic. The channel host adapter firmware 110 shown in FIG. 1 includes "N" initiator ports 114. In one or more embodiments of the present invention the transport protocol utilized is HPF. Embodiments are not limited to using HPF as other transport protocols such as, but not limited to InfiniBand can also be utilized.

Also included in the channel host adapter firmware 110 shown in FIG. 1 is a HPF framer 112 (HPFF) which senses the anticipated buffer requirement of a given application 108 for each logical path between the channel host 102 and the control unit 106. The HPFF 112 frames a new IU type referred to herein as an all-in-one IU (AIO IU) that can ship bulk data transfer (also referred to herein as a "data stream") irrespective of commands and data frames. An example embodiment of an AIO IU is shown below in FIG. 5. The HPFF 112 adds look ahead information to the AIO IU for the storage controller 126 to have a prediction of subsequent I/O operations on the same logical path. An example of look ahead information is an anticipated number of buffers for the subsequent I/O on the logical path. Another example of look ahead information is quality of service (QoS) requested for the subsequent I/O on the logical path.

The AIO IUs are received at the control unit 106 by target port adapter firmware which includes "N" target port adapters 116. The control unit 106 also includes a host port manager 118 (HPM) and a pluggable wire-speed memory unit, HPF AIO cache 122. The HPM 118 inspects the IU on arrival at a target port adapter 116, classifies it as an AIO IU, tags it for in-order processing, and stores the IU in the HPF AIO cache 122. In addition, the HPM 118 learns the anticipated buffer requirements based on the amount of data contained in the AIO IO frame and attempts to ensure that the best number of free buffers (buffer count) is used. The anticipated buffer requirement can advise the control unit to request the number of buffers required for the current I/O to be completed successfully. The new buffer count becomes the new FTBC, which is used by the core storage controller 126 as part of a status IU.

By tagging each frame, the HPM 118 ensures that core storage controller 126 can process the frames in-order using order reconstruction mechanism 124. In accordance with one or more embodiments of the present invention, the core storage controller 126 instructs the HPM 118 to move the IU contents to DRAM 126, in the order they were received, for processing and for subsequent writes to the backend disk subsystem 132.

In accordance with one or more embodiments of the present invention, the HPF AIO cache 122 is a pluggable component, which can provide nearly unlimited buffers for HPF. As shown in FIG. 1, the HPF AIO cache 122 is attached to port controller application-specific integrated circuit (ASIC) 120. Any form of storage class memory can be implemented by exemplary embodiments of the present invention as long as it has direct access to the port controller ASIC 120. The port controller ASIC provides direct access to the HPF AIO cache 122 to store the spill over data, so that the HPM 118 can tag them quick. This can improve the processing speed of one or more embodiments described herein.

Figure 2:
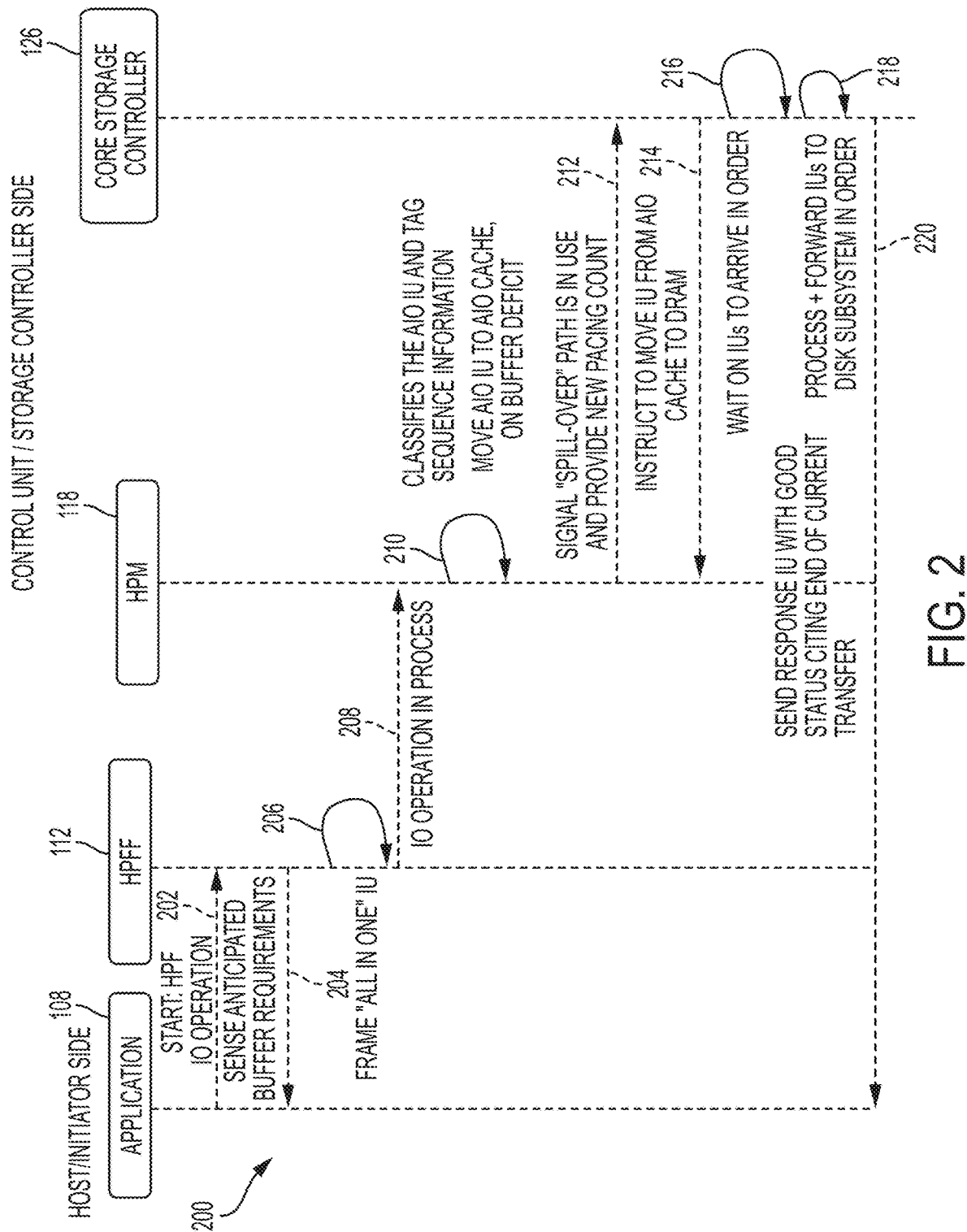
FIG. 2 is a flow diagram of a process for guaranteed delivery in receiver side overcommitted communication adapters in accordance with one or more embodiments of the present invention.

Turning now to FIG. 2, a flow diagram of a process 200 for guaranteed delivery in receiver side overcommitted communication adapters is generally shown in accordance with one or more embodiments of the present invention. The processing shown in FIG. 2 can be performed by all or a portion of application 108, HPFF 112, HPM 118, and core storage controller 126 all of FIG. 1. The process starts at 202 with the application 108 signaling an intent to perform data transfer in HPF mode to the HPFF 112. As used herein, the term "HPF mode" refers to a transport mode supported in FICON that allows initiators to have high speed data transfer by eliminating Acknowledgment IUs from the control unit, thereby reducing overhead due to protocol handshakes during each data transfer operation. At 204, upon receiving the request, the HPFF 112 senses the anticipated buffer requirements and generates the anticipated FTBC. At 206, the HPFF 112 frames an AIO IU which can include filling in the look ahead field with the anticipated FTBC. At 208, the HPFF transmits the AIO IU to the HPM 118 and the I/O operation is in progress.

At 210 of FIG. 2, the HPM 118 classifies the AIO IU as an AIO type, tags the sequence for processing in the correct order, and checks whether the AIO IU can be directly admitted to, or stored in, a DRAM, such as DRAM 128 of FIG. 1 (e.g., determines whether the buffers are full). At 212, if it is determined that the AIO IU cannot be admitted to the DRAM directly then the HPM 118 moves the AIO IU to an AIO cache, such as HPF AIO cache 122 of FIG. 1. At 212, if it is determined that the AIO IU can be admitted to the DRAM directly then the HPM 118 moves the AIO IU to the DRAM and typical I/O processing path is followed. The processing path can include, reserving the buffer space, and then using the buffers for writes as part of the data transfer. When the operation is complete, the buffers are relinquished to a free pool, or free space in the DRAM.

Referring to FIG. 2, 214-220 are performed to handle the I/O when the AIO IU is moved to the AIO cache at 212. At 214, the HPM 118 signals to the core storage controller 126 that the spill-over path is in use and provides the storage controller 126 with a new pacing count. This indicates to the storage controller 126 that there are IUs available in the AIO cache and provides the new FTBC (the pacing count) based on the received anticipated FTBC from the HPFF 112. At 214, the core storage controller 126 instructs the HPM 118 to move an IU from the AIO cache to the DRAM. The IUs are moved to the DRAM using core storage controller logic, such as order reconstruction mechanism 124 of FIG. 1, in the order that they were received based on the tag assigned by the HPM 118. At 216, the core storage controller 126 waits for the IU to arrive in the DRAM. At 218, the core storage controller 126 processes the IU contents with an I/O disk subsystem, such as backend disk subsystem 132 of FIG. 1. At 220, a response IU with a status of "good" and indicating the end of the current transfer is sent to the initiating application.

In one or more embodiments of the present invention, the HPFF 112 is part of the channel host adapter firmware 110 and the HPM is part of the target port adapter firmware. The negotiation of finding the anticipated FTBC at HPFF can be implementation specific, and any manner known in the art can be implemented by one or more embodiments of the present invention.

Turning now to FIG. 3, a flow diagram of a process 300 at a receiver side communication adapter is generally shown in accordance with one or more embodiments of the present invention. The processing shown in FIG. 3 can be performed by computer instructions executed by a control unit, such as HPM 118 of FIG. 1 executing on control unit 106 of FIG. 1. At block 302, the control unit receives an AIO IU and at block 304 a sequencing tag is added to the AIO IU. This sequencing tag is inserted by the HPM to ensure that the storage controller process the commands in order. Implementations of the tag are not limited to any specific implementation or value. At block 306 it is determined whether there is a buffer available at the control unit to admit, or store, the AIO IU.

If it is determined, at block 306, that a buffer is available, then processing continues along a standard HPF receive path that includes blocks 308, 310, 312, and 314. At block 308 the AIO IU is stored in DRAM. At block 310, the storage controller, such as core storage controller 126 of FIG. 1, performs HPF IU processing. At block 312, a response IU is sent back to the requesting host, such as channel host 102 of FIG. 1. If no reportable errors were encountered when performing the I/O, the response IU can have a status of "GOOD-STATUS." At block 314 the operation is complete.

If it is determined, at block 306, that a buffer is not available, then processing at block 316 with storing the AIO IU into AIO cache, such as HPF AIO cache 122 of FIG. 1. At block 318, a signal is sent to the storage controller to indicate that the spill-over path is in use. Processing continues at block 310 with the storage controller performing HPF IU processing. At block 312, a response IU is sent back to the requesting host, and if no reportable errors were encountered when performing the I/O, the response IU can have a status of "GOOD-STATUS." At block 314 the operation is complete.

Turning now to FIG. 4, a flow diagram of a process 400 at a storage controller for performing a spill-over path is generally shown in accordance with one or more embodiments of the present invention. The processing shown in FIG. 4 can be performed by computer instructions executed by a storage controller, such as core storage controller 126 of FIG. 1. The processing shown in FIG. 4 is performed by the storage controller in response to receiving a signal that AIO IUs are stored in an AIO cache, such as HPF AIO cache 122 of FIG. 1. At block 402, the storage controller determines that it is ready to process the AIO IUs stored in the AIO cache based, for example, on there being free space in a DRAM, such as DRAM 128 of FIG. 1. At block 404, it is determined if any IUs are in the AIO cache. If no IUs are in the AIO cache, then processing continues at block 402.

If as determined at block 404, that there are IUs in the AIO cache, then processing continues at block 406, and the storage controller instructs the control unit to move IUs from the AIO cache to the DRAM. At block 408, the storage controller waits for the IUs to arrive in the DRAM. At block 410, the storage controller processes and forwards the IUs, in the order received based on the tags, to a disk subsystem, such as backend disk subsystem 132 of FIG. 1.

Figure 5:
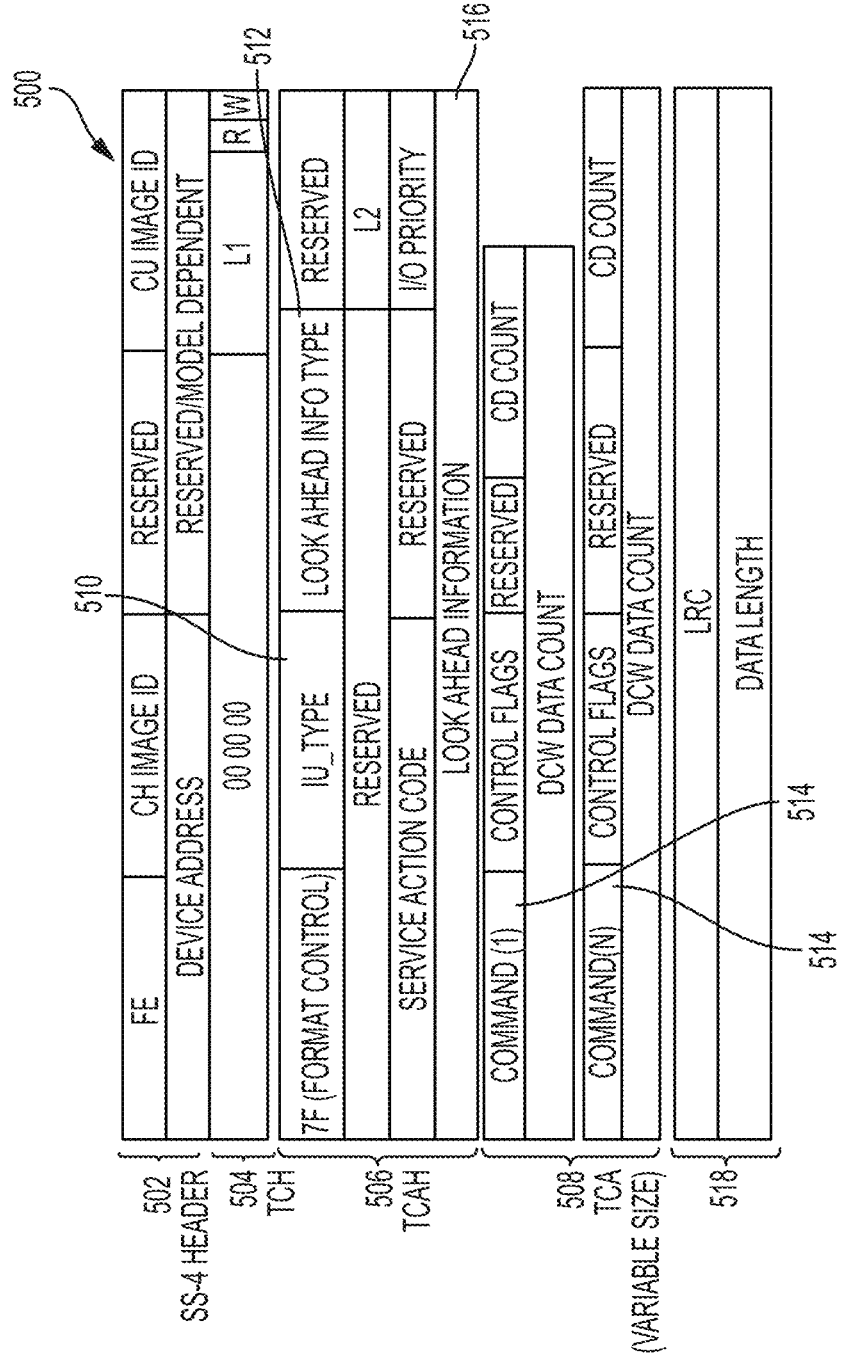
FIG. 5 depicts an all-in-one information unit (AIO IU) in accordance with one or more embodiments of the present invention.

Turning now to FIG. 5, an AIO IU 500 is generally shown in accordance with one or more embodiments of the present invention. The AIO IU 500 uses the same format as an HPF command IU with some additional fields. Similar to an HPF command IU, the AIO IU 500 includes a SB-4 header portion 502, followed by a transport command control block (TCCB) that includes a transport command header (TCH) portion 504, a transport command area header (TCAH) portion 506, and a transport command area (TCA) portion 508, and a longitudinal redundancy check (LRC) and data length (DL) portion 518.

In one or more embodiments of the present invention, the AIO IU 500 uses reserved fields in the HPF command IU. In the embodiment of the AIO IU 500 shown in FIG. 5, the additional fields include an IU_TYPE field 510 for specifying that the IU is an AIO IU; a look ahead information type field 512 for specifying a type of look ahead information that is located in the look ahead information type field 516; a look ahead information field 516; and up to N command fields 514, wherein N can be any number. In an embodiment, if the look ahead information type field 512 contains a "01" then this implies that the look ahead information field 516 will contain the anticipated buffer counts/number of buffers. In an embodiment, if the look ahead information type field 512 contains a "10" then this implies that the look ahead information field 516 will contain quality of service (QoS) information.

Embodiments of the processing described herein use HPF as an example environment. It will be appreciated by those skilled in the art that embodiments can be utilized by other communication schemes that transfer data between a host and a storage computer such as, but not limited to transmission control protocol (TCP) offloading and remote direct memory access (RDMA).

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving an input/output (I/O) request comprising a data stream from a host processor, the I/O request further comprising look ahead information and a look ahead type field for specifying a type of the look ahead information, the type one of quality of service and anticipated buffer count, the receiving at a network adapter of a storage controller that manages storage for the host processor, the storage controller comprising a storage buffer to store data received from the host processor before migrating it to the storage and the storage controller further comprising a data cache and a control unit;
assigning, by the control unit, a sequence tag to the data stream, the sequence tag indicating an order of receiving the data stream at the network adapter;
determining whether the storage buffer has enough free space to store the received data stream;
storing, by the control unit, the received data stream in the storage buffer based at least in part on determining that the storage buffer has enough free space to store the received data stream;
storing, by the control unit, the received data stream in the data cache based at least in part on determining that the storage buffer does not have enough free space to store the received data stream; and
based at least in part on storing the received data stream in the data cache:
determining an amount of free space in the storage buffer; and
moving the received data stream from the data cache to the storage buffer based on the amount of free space in the storage buffer being greater than an estimated amount of space required to store the received data stream and the sequence tag indicating that the data stream was received prior to any other data stream currently stored in the data cache.

2. The method of claim 1, wherein the storage is persistent storage.

3. The method of claim 1, wherein the receiving is via a high performance fibre connection channel.

4. The method of claim 1, wherein the receiving is via a storage area network (SAN) switch.

5. The method of claim 1, wherein the data stream is variable in length.

6. The method of claim 5, wherein the data stream is contained in an information unit (IU) that comprises the estimated amount of space required to store the received data stream.

7. The method of claim 1, wherein the storage buffer comprises a plurality of buffers and the estimated amount of space required to store the received data stream includes an estimate of a number of the plurality of buffers required to store the received data stream.

8. The method of claim 1, wherein the data cache stores a plurality of received data streams including the received data stream, and the plurality of received data streams are moved from the data cache to the storage buffer in an order that they were stored in the data cache.

9. The method of claim 1, wherein the data cache is a pluggable into the storage controller and data is stored in the data cache at wire speed.

10. A system comprising:
a memory having computer readable instructions; and
one or more processors for executing the computer readable instructions, the computer readable instructions controlling the one or more processors to perform operations comprising:
receiving an input/output (I/O) request comprising a data stream from a host processor, the I/O request further comprising look ahead information and a look ahead type field for specifying a type of the look ahead information, the type one of quality of service and anticipated buffer count, the receiving at a network adapter of a storage controller that manages storage for the host processor, the storage controller comprising a storage buffer to store data received from the host processor before migrating it to the storage, and the storage controller further comprising a data cache and a control unit;
assigning, by the control unit, a sequence tag to the data stream, the sequence tag indicating an order of receiving the data stream at the network adapter;
determining whether the storage buffer has enough free space to store the received data stream;
storing, by the control unit, the received data stream in the storage buffer based at least in part on determining that the storage buffer has enough free space to store the received data stream;
storing, by the control unit, the received data stream in the data cache based at least in part on determining that the storage buffer does not have enough free space to store the received data stream; and
based at least in part on storing the received data stream in the data cache:

determining an amount of free space in the storage buffer; and moving the received data stream from the data cache to the storage buffer based on the amount of free space in the storage buffer being greater than an estimated amount of space required to store the received data stream and the sequence tag indicating that the data stream was received prior to any other data stream currently stored in the data cache.

11. The system of claim 10, wherein the receiving is via a high performance fibre connection channel.

12. The system of claim 10, wherein the receiving is via a storage area network (SAN) switch.

13. The system of claim 10, wherein the data stream is variable in length.

14. The system of claim 10, wherein the data cache stores a plurality of received data streams including the received data stream, and the plurality of received data streams are moved from the data cache to the storage buffer in an order that they were stored in the data cache.

15. The system of claim 10, wherein the data cache is a pluggable into the storage controller and data is stored in the data cache at wire speed.

16. A computer program product comprising a non-transitory computer readable storage medium having program instructions embodied therewith, the program instructions executable by a processor to cause the processor to perform operations comprising:

receiving an input/output (I/O) request comprising a data stream from a host processor, the I/O request further comprising look ahead information and a look ahead type field for specifying a type of the look ahead information, the type one of quality of service and anticipated buffer count, the receiving at a network adapter of a storage controller that manages storage for the host processor, the storage controller comprising a storage buffer to store data received from the host processor before migrating it to the storage, and the storage controller further comprising a data cache and a control unit/O operation on the logical data path;

assigning, by the control unit, a sequence tag to the data stream, the sequence tag indicating an order of receiving the data stream at the network adapter;

determining whether the storage buffer has enough free space to store the received data stream;

storing, by the control unit, the received data stream in the storage buffer based at least in part on determining that the storage buffer has enough free space to store the received data stream;

storing, by the control unit, the received data stream in the data cache based at least in part on determining that the storage buffer does not have enough free space to store the received data stream; and based at least in part on storing the received data stream in the data cache:

determining an amount of free space in the storage buffer; and moving the received data stream from the data cache to the storage buffer based on the amount of free space in the storage buffer being greater than an estimated amount of space required to store the received data stream and the sequence tag indicating that the data stream was received prior to any other data stream currently stored in the data cache.

17. The computer program product of claim 16, wherein the receiving is via a high performance fibre connection channel.

18. The computer program product of claim 16, wherein the data stream is variable in length and is contained in an information unit (IU) that comprises the estimated amount of space required to store the received data stream.

19. The computer program product of claim 16, wherein the data cache stores a plurality of received data streams including the received data stream, and the plurality of received data streams are moved from the data cache to the storage buffer in an order that they were stored in the data cache.

* * * * *